Figure 1:
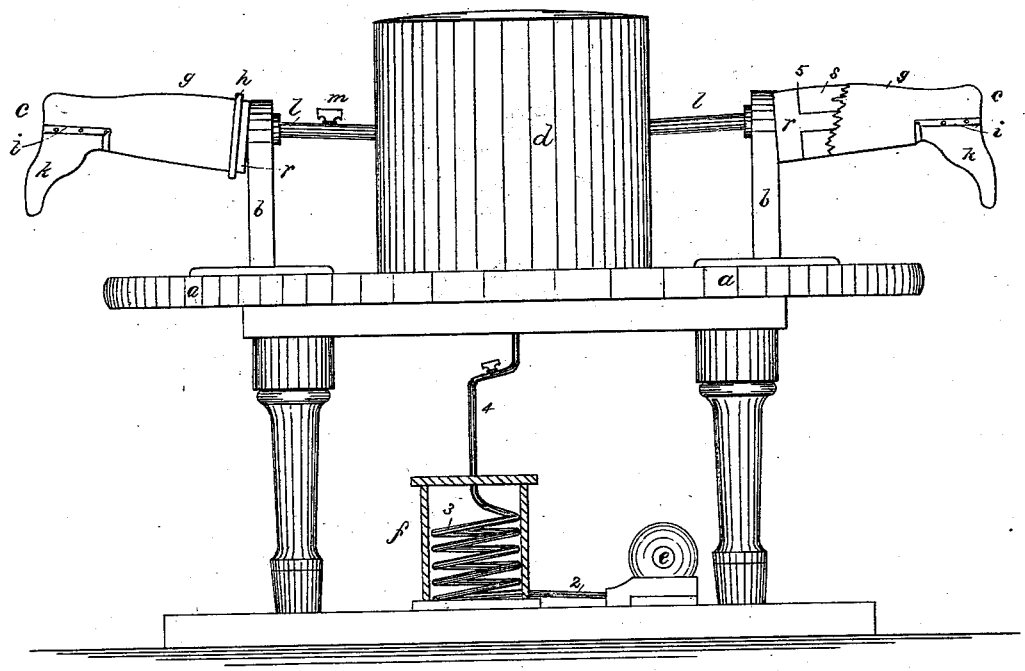

(Model.)

J. A. AMBLER & E. L. WIRES.
Boot-Treeing Apparatus.

No. 227,669.

Patented May 18, 1880.

WITNESSES  
L. F. Connor  
V. D. Dearborn

INVENTORS  
James A. Ambler and  
Ephraim L. Wires.  
by Crosby Gregory Atty.

UNITED STATES PATENT OFFICE.

JAMES A. AMBLER, OF NATICK, AND EPHRAIM L. WIRES, OF MILFORD, MASSACHUSETTS.

BOOT-TREEING APPARATUS.

SPECIFICATION forming part of Letters Patent No. 227,669, dated May 18, 1880.

Application filed March 15, 1880. (Model.)

*To all whom it may concern:*

Be it known that we, JAMES A. AMBLER, of Natick, county of Middlesex, and EPHRAIM L. WIRES, of Milford, county of Worcester, State of Massachusetts, have invented an Improvement in Boot-Treeing Apparatus, of which the following description, in connection with the accompanying drawings, is a specification.

This invention relates to improvements in boot-treeing apparatus, and has especial reference to such a construction of the parts thereof as will permit the tree and boot thereon to be heated by means of hot air or gases during the treeing operation.

A patent granted one of us, No. 224,506, to which reference may be had, shows a hollow tree adapted to receive and be heated by steam, independent mechanical devices being employed by which to expand or contract the tree instead of expanding the same by the direct action and pressure of steam.

Boot-trees having their operating or expanding devices drawn out mechanically are now commonly employed in boot-factories, such trees being known as the "Howe tree," they being made substantially in accordance with United States Patent No. 14,951, May 27, 1856.

In this our invention the back, front part, and foot of the tree are all made hollow or shell-like, and the tree may be expanded and contracted in any well-known way, and by means of any well-known or common devices.

These features being old and not especially of this our present invention, we have not deemed it necessary to specifically show and describe them.

Our invention consists, essentially, in an apparatus for treeing boots, it containing, besides the hollow shell-like tree and suitable expanding mechanism, a flexible, and preferably india-rubber, expanding jacket, to expand with the tree and keep within it the heated air or gases introduced into the tree, thus permitting the heated air to be expended in heating the boot to the proper temperature or degree rather than to be wasted, as would be the case were not the tree covered by the expanding jacket.

The heated air to be introduced into the tree may be supplied through a coiled or other pipe heated by a suitable furnace, the air being forced through the coil by any usual blower.

The heated air will preferably be contained in a receiving-chamber.

Instead of heating the air by passing through a coil in a furnace, we may, if it is desired, force air into the receiving-chamber by an air-pump under sufficient pressure to generate the desired amount of heat, or we may heat the air in a drum or steam-chest on its way to the tree.

Figure 2:
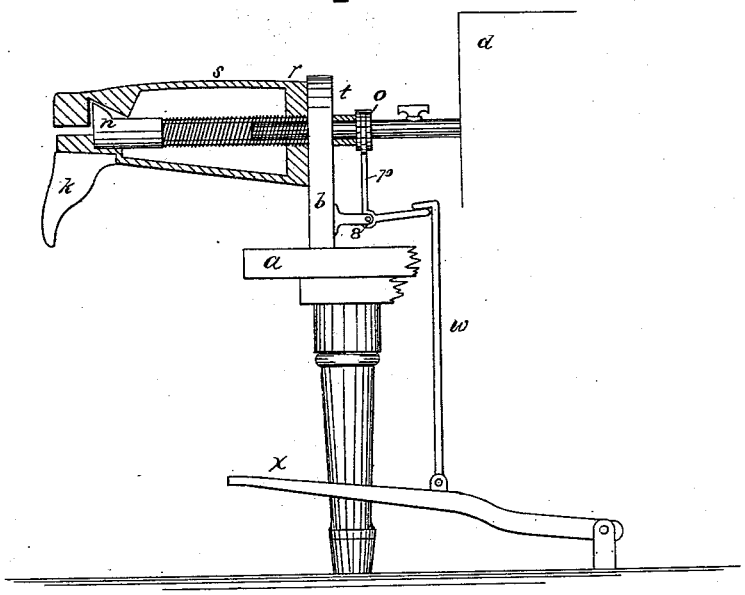

Figure 1 represents, in side elevation, sufficient of a boot-treeing machine to enable us to delineate our invention in one form, the boot-tree at the left of the machine having upon it the flexible jacket, whereas at the right the jacket is broken out to show the back and front parts of the tree. Fig. 2 is a detail, showing the hour-rod and devices connected therewith, for expanding the tree by a suitable treadle whenever the boot-tree, during the rotation of the boot-tree carrying-plate, comes into position opposite the treadle.

In the drawings, $a$ is supposed to be a rotating bed or plate provided with two or more standards, $b$, to support two or more boot-trees, $c$, of usual and suitable construction, the said trees being made shell-like or hollow, and being provided with mechanical devices by which, at the proper time, to expand them in the usual way. We have shown the hot-air receiver $d$ as located at the center of this plate, and in this present instance of our invention it is supplied with hot air by a pressure-blower, $e$, of any usual kind, which forces air through the pipe 2, coil 3, and pipe 4, the air from the blower passing through the said coil 3, placed in a suitable furnace, $f$, or heating-chamber provided with suitable grate, draft-passages, and flues of usual construction; or the coil may be externally heated in a steam-chamber.

In boot-trees now commonly used the back is separated from the front to the extreme ends of the tree; but in our tree, in order to confine the flexible jacket $g$ to the top of the tree, so as to prevent the escape of hot air, we have made the top end, $r$, of the tree as one immovable piece, both front and back, and the end of the expansible or movable back piece, $s$, is made to terminate, as at 5, short of the top end of the tree. As herein shown, the jacket is held at the top end of the tree by means of a band, $h$; but the end of the tubular jacket, at or near the ankle of the tree, is confined by means of metal straps or bands $i$.

The foot $k$ of the tree, made hollow and in communication with the interior of the leg of the tree and with the hot air therein, does not need to be covered with a jacket, but may be. The pipe $l$, provided with a suitable valve, $m$, leads hot air from the receiver $d$ to the interior of the hollow tree, and as the latter is expanded by any of the usual mechanical apparatus, and the front and back parts of the tree, or its leg part, are separated, the flexible jacket $g$ retains the hot air and permits the heat forced into the tree to be made available for keeping the tree and boot thereon warm for the treeing operation, whereas were it not for said jacket to cover the joints of the tree the hot air might readily escape into the atmosphere without being fully utilized for warming the boot or shoe and tree.

In practice, we may mount the boot-tree so that it may be rotated either mechanically or by hand while being treated or rubbed in treeing.

In practice, the expanding-rod $t$ of the tree will be operated by a treadle mechanism; but such mechanism and the support for the rotating table, in order to permit the said mechanism to be operated, forms no part of this present application, as it is especially described and claimed in an application of James A. Ambler filed April 17, 1880, to which reference may be had.

In Fig. 2 the expanding-rod, instead of being made solid, as usual, is shown as made tubular, as at $t$, and it is fitted about and so as to slide on the pipe $l$, and the spreading devices or inclines $n$ (one or more) are carried by the said tubular rod. The outer end of the tubular rod will have an annularly-grooved collar, $o$, which will be embraced by the forked end of an elbow-lever, $p$, pivoted at 8, the lower arm of the lever being so shaped as to be embraced by the link $w$, attached to the treadle $x$.

The tree, at or near its top end, will be provided with a suitable opening or petcock to control the exit of air therefrom.

We claim—

1. In a boot-tree, a flexible covering-jacket, substantially as described.

2. In a boot-treeing apparatus having an expansible shell-like or hollow tree, a flexible jacket to cover the tree, combined with means for introducing hot air into the tree, to create and maintain the necessary amount of heat therein during the treeing operation, substantially as described.

In testimony whereof we have signed our names to this specification in the presence of two subscribing witnesses.

JAMES A. AMBLER.
EPHRAIM L. WIRES.

Witnesses:
G. W. GREGORY,
N. E. C. WHITNEY.